3,331,862
PHENOLPHTHALEIN-MONO-PHOSPHATE
DERIVATIVES
Edward J. Merrill, Whippany, and Arthur L. Babson, Morris Plains, N.J., assignors to Warner-Lambert Pharmaceutical Company, Morris Plains, N.J., a corporation of Delaware
No Drawing. Filed June 5, 1964, Ser. No. 373,082
3 Claims. (Cl. 260—396)

This invention relates to novel mono-phosphate salts of phenolphthalein having the structural formula:

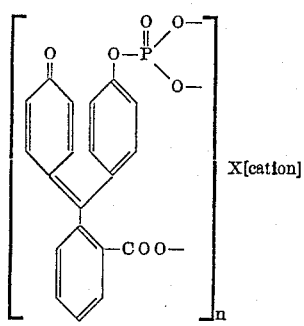

wherein the cation X is a mono, di, or tri-valent metallic ion such as, for example, sodium, potassium, calcium, barium, copper, aluminum or iron, or a protonated organic amine such as ammonium and $n$ is an integer. The total of the combined cation valences and those of the phenolphthalein phosphate moiety are equal to each other. Thus, for example, when the cation is a monovalent sodium ion, the mono-phosphate derivative of phenolphthalein is tri-sodium phenolphthalein-mono-phosphate.

This invention also includes within its scope a novel process for the production of the above compounds as well as intermediates obtained during their synthesis.

The compounds of this invention are particularly useful as substrates for the determination of phosphatase enzymes in a procedure such as, for example, the determination of alkaline phosphatase in blood serum, because the amount of phenolphthalein released by enzymatic hydrolysis of the ester bears a linear relationship to the enzyme concentration. This relationship is not observed in the case of the hydrolysis of the known phenolphthalein diphosphate since two phosphoryl radicals must first be removed before any free phenolphthalein is formed. Thus, when utilizing the latter as the substrate the free phenolphthalein formed cannot be easily related to the enzyme concentration. A further advantage of employing the new and novel phenolphthalein monophosphate described above is that proportionately more free phenolphthalein is released with this substrate for any given amount of enzyme, a factor which makes this substrate much more sensitive and therefore much more accurate in the measurement of low but clinically significant levels of phosphatase activity.

The compounds of this invention may be produced according to the following schematic diagram:

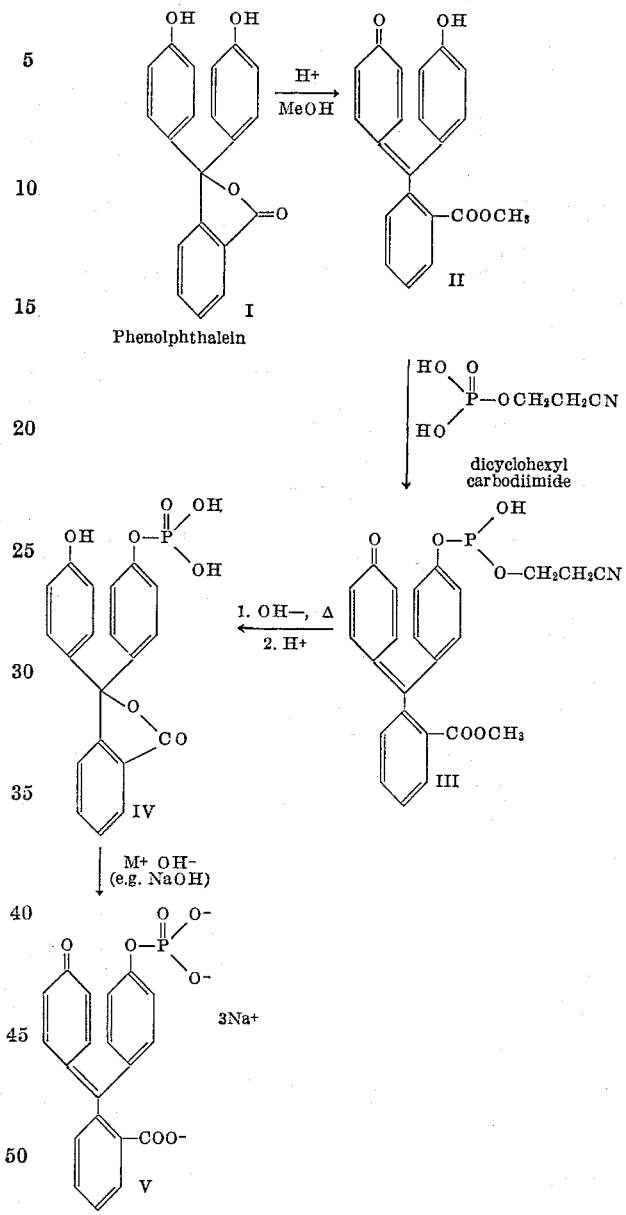

In the first step of the reaction above, phenolphthalein is converted to its methyl ester according to the process described by Green and King, J. Soc. Chem. and Ind. (London) 27, 4 1908. Essentially, phenolphthalein is allowed to react with absolute methanol in the presence of sulfuric acid in an atmosphere of nitrogen to give the corresponding methyl ester II. The ester II is then condensed with β-cyanoethyl phosphate and dicyclohexylcarbodiimide in dry pyridine to give the intermediate compound III. This condensation may be effected at ambient temperature, for example at a temperature of from 20 to 30° C. over a period of 5 days.

Compound III may be converted to the free phenolphthalein mono-phosphate by reaction first with a base such as 1 N sodium hydroxide followed by reaction with a strong acid such as 6 N hydrochloric acid.

To form the desired salts of phenolphthalein monophosphate, the latter is treated with compounds such as sodium or potassium hydroxide, and the reaction product is recovered in the form of a hydrated salt.

In order to further illustrate the practice of this invention, the following examples are given:

Example 1

To a magnetically stirred solution of 8.0 g. (25 mM.) phenolphthalein in 80 cc. of absolute methanol, under a stream of nitrogen, is added 54.4 cc. of concentrated sulphuric acid at such a rate as to maintain gentle refluxing. After complete addition, gaseous hydrogen chloride is bubbled through the reaction mixture while allowing it to reflux gently for one hour. The cooled reaction mixture and 140 cc. of concentrated ammonium hydroxide is simultaneously added to 500 cc. ether, which is cooled and stirred in an acetone-Dry Ice bath to keep the temperature below 25° C. The organic phase is washed with 2× 10 cc. cold aqueous ammonium hydroxide, dried with $MgSO_4$, and stripped to give a red tacky semi-solid. Trituration of this solid repeatedly with 10 cc. portions of anhydrous ether eventually gives a solid which is discarded. The ether extracts are combined and stripped to give 5.2 g. (62.5%) of methyl phenolphthalein as an orange fluffy solid. This material is kept in a vacuum desiccator over KOH.

Example 2

To 10 cc. of an aqueous solution containing 1.51 g. (10 mM.) β-cyanoethylphosphate (prepared by percolating an aqueous solution of 3.04 g. of the barium mono-hydrate salt of β-cyanoethyl phosphate over a polystyrene sulfonic acid ion exchange resin such as Amberlite IR-120 (H+) (Rohm & Haas) is added 100 cc. pyridine (dried over KOH) and the solution stripped to dryness in vacuo. To this oil is added 1.66 g. (5 mM.) of methyl phenolphthalein and 100 cc. dry pyridine, and the solution stripped to dryness in vacuo. The residue is dissolved in 25 cc. dry pyridine and 6.18 g. (30 mM.) dicyclohexyl carbodiimide added in 25 cc. dry pyridine. An almost immediate precipitate appears. After 5 days at room temperature the tightly stoppered reaction is opened, 5 cc. $H_2O$ added and after 3 hours at 20 to 30° C. is filtered. The filtrate is stripped to dryness and the resulting oil dissolved in 50 cc. 1 N NaOH, filtered and then refluxed for 15 minutes. Solution is cooled and extracted with 3× 15 cc. $CHCl_3$. The aqueous phase is clarified by filtration and the cooled filtrate acidified by the addition of 15 cc. 6 N HCl. The supernate is decanted from a viscous oil which is the crude phenolphthalein-mono-phosphate. The crude phenolphthalein-monophosphate is dissolved in sufficient 1 N NaOH to give a strongly alkaline solution. An equal volume of MeOH is added, followed by 5 volumes of ether. Trituration of the oily precipitate with 3× 10 cc. acetonitrile gives a yellow solid which is further purified by reprecipitation from a methanol solution by addition of two volumes of acetonitrile. The resulting trisodium phenolphthalein-mono-phosphate is obtained as a yellow solid which reddens at ca. 90° C. and then gradually blackens but does not melt below 400° C.

Analysis for $C_{20}H_{12}O_7PNa_3 \cdot 1\frac{1}{2}H_2O$: Calcd: P. 6.31%; Na, 14.04%; $H_2O$, 5.50%. Found: P, 6.37%; Na, 14.82%; $H_2O$, 5.3%.

IR (Nujol): 720, 750, 830, 880, 990, 1150 (broad), 1235, 1500, 1535, 1585, 1600, 2850, 2900.

It is to be understood that the foregoing detailed description is given merely by way of illustration and that many variations may be made therein without departing from the spirit of our invention.

Having described our invention, what we desired to secure by Letters Patent is:

1. A compound of the formula:

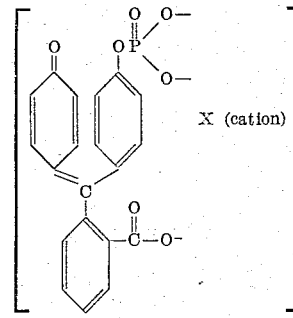

wherein X is a member selected from the group consisting of sodium, potassium, calcium, barium, copper, aluminum, iron and ammonium and the total of the combined cation valences and those of the phenolphthalein phosphate moiety are equal to each other.

2. Tri-sodium phenolphthalein-mono-phosphate.

3. A compound of the formula:

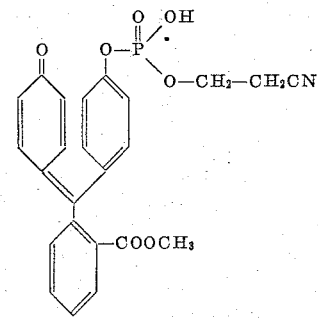

References Cited

UNITED STATES PATENTS

| | | | |
|---|---|---|---|
| 2,894,680 | 5/1961 | Walsh | 260—982 |
| 3,132,171 | 5/1964 | Plaut | 260—978 |

OTHER REFERENCES

Henningson et al.: Chemical Abstracts, vol. 53, column 22184a (1959).

Huggins et al.: J. Biol. Chem., vol. 159, pp. 399–402 (1945).

ALEX MAZEL, *Primary Examiner.*

J. A. NARCAVAGE, *Assistant Examiner.*